US011625450B1

(12) United States Patent
Roman et al.

(10) Patent No.: US 11,625,450 B1
(45) Date of Patent: Apr. 11, 2023

(54) AUTOMATED PREDICTIVE VIRTUAL ASSISTANT INTERVENTION IN REAL TIME

(71) Applicant: FMR LLC, Boston, MA (US)

(72) Inventors: Sorin Adrian Roman, Hampton Falls, NH (US); Bibhash Chakrabarty, Bangalore (IN); Shefali Yadav, Bhilwara (IN); Sateesh Panda, Bengaluru (IN); Manish Gupta, Bhopal (IN)

(73) Assignee: FMR LLC, Boston, MA (US)

( * ) Notice: Subject to any disclaimer, the term of this patent is extended or adjusted under 35 U.S.C. 154(b) by 0 days.

(21) Appl. No.: 17/859,532

(22) Filed: Jul. 7, 2022

(51) Int. Cl.
*G06F 16/00* (2019.01)
*G06F 16/957* (2019.01)
*H04L 67/50* (2022.01)
*G06F 16/9535* (2019.01)
*H04L 51/02* (2022.01)

(52) U.S. Cl.
CPC ........ *G06F 16/957* (2019.01); *G06F 16/9535* (2019.01); *H04L 67/535* (2022.05); *H04L 51/02* (2013.01)

(58) Field of Classification Search
CPC .. G06F 3/04847; G06F 3/0481; G06F 16/951; G06F 9/453; G06F 16/954; G06F 16/9574; G06F 16/2237; G06F 16/9535; G06F 16/957; G06Q 10/10
See application file for complete search history.

(56) References Cited

U.S. PATENT DOCUMENTS

| | | | |
|---|---|---|---|
| 6,757,362 B1* | 6/2004 | Cooper | H04M 3/527 379/88.16 |
| 10,270,869 B2 | 4/2019 | Fulton | |
| 10,515,380 B2* | 12/2019 | Kannan | G06Q 30/0203 |
| 10,650,432 B1* | 5/2020 | Joseph | G06N 3/08 |
| 2013/0006897 A1* | 1/2013 | Jain | G06N 5/022 706/14 |
| 2014/0279050 A1 | 9/2014 | Makar et al. | |
| 2015/0178337 A1* | 6/2015 | Hellstrom | G06F 16/9535 706/14 |
| 2015/0347382 A1* | 12/2015 | Dolfing | G06F 40/274 704/9 |
| 2016/0180232 A1* | 6/2016 | Tsubouchi | G06N 7/005 706/48 |
| 2019/0384794 A1* | 12/2019 | Holly, Jr. | G06F 40/186 |
| 2020/0036810 A1* | 1/2020 | Howard | G06F 16/5854 |
| 2021/0082414 A1 | 3/2021 | Johnson | |
| 2022/0182342 A1 | 6/2022 | Foroughi et al. | |

* cited by examiner

*Primary Examiner* — Yicun Wu
(74) *Attorney, Agent, or Firm* — Cesari & McKenna, LLP (57) ABSTRACT

Methods and apparatuses are described for automated predictive virtual assistant intervention. A server computing device captures clickstream data corresponding to web browsing sessions of a user at a client computing device, and generates predicted needs of the user based upon the clickstream data. The server computing device identifies virtual assistant messages for the user based upon the predicted needs of the user, and displays the identified virtual assistant messages in a virtual assistant application on the client computing device.

22 Claims, 9 Drawing Sheets

Customer service

Do you have questions?
The Virtual Assistant* has answers. Ask about passwords, beneficiaries, and other service-related topics Hi, I'm the Virtual Assistant,* a Chatbot designed to help you. Ask me your questions about Fidelity's products and services.

Not sure where to start? Select from these commonly asked questions to start a conversation:

I need help with fixed income.

How can I rebalance my portfolio?

Has my CD lost value?

*Personalized VA questions based on customer intents shown after 2 seconds.*

Type your question here...

Ways to connect

If you haven't found what you're looking for, visit our classic experience or contact us.

Contact us    Find an Investor Center    Mailing addresses

902

904

900

AUTOMATED PREDICTIVE VIRTUAL ASSISTANT INTERVENTION IN REAL TIME

TECHNICAL FIELD

This application relates generally to methods and apparatuses, including computer program products, for automated predictive virtual assistant (VA) intervention in real time.

BACKGROUND

Typical customer service environments are reactive, meaning that the systems configured to receive and handle customer service requests do not have any significant prior knowledge of the intent behind an incoming customer interaction, the customer's needs, and/or customer-specific attributes (such as demographics and user profile data). As one example, interactions with existing virtual assistant (VA) applications in a typical customer service setting is conducted without any predictive understanding of the customer's intent or reason behind initiating the interaction. For example, a user may be browsing an enterprise's website to look for certain information that is responsive to a particular need—but the user may struggle to find the answers he or she wants. Upon activating a VA application in the browser software, the customer may be greeted with a default message that simply asks the user to provide a query or describe the information that they are seeking. This causes the user to spend additional time interacting with the VA application in order to get the information. In some cases, the VA application may not provide the exact information that is responsive to the user request. In another scenario, a user may simply stop browsing the website after failing to find the information and instead place a phone call or send an email to a live customer service representative at a call center, who must then gather information about the user's request and try to provide a satisfactory response. As a result, the enterprise must incur significant costs in staffing of customer service centers such that the customer expends unproductive time searching for a response, ultimately having a suboptimal experience—leading to frustration with the enterprise.

In the above scenario, the VA platform and application is not configured to obtain any pre-existing and/or real-time knowledge about the potential intent or customer needs behind the incoming VA service request. In addition, the VA platform cannot proactively intervene in a user's web browsing session to offer insightful questions and links to information based upon predictions of user intent and needs.

SUMMARY

Therefore, what is needed are methods and systems that leverage advanced machine learning algorithms and techniques, including generation of machine-readable vector representations of user clickstream data, to predict user needs and user intents at a multi-tiered granularity for subsequent virtual assistant sessions. Such predictions of need and intent can then be advantageously employed to both proactively and automatically intervene in a user's web browsing session with a VA instance pre-populated with relevant and actionable information, and to understand a user's intent more precisely when establishing a VA session so that customized responses can be quickly and automatically presented to the user.

The invention, in one aspect, features a system for automated predictive virtual assistant intervention. The system comprises a server computing device with a memory for storing computer-executable instructions and a processor that executes the computer-executable instructions. The server computing device captures clickstream data corresponding to one or more web browsing sessions between a client computing device of a user and one or more web servers. The server computing device generates one or more predicted needs of the user based upon the clickstream data, comprising: creating, from the clickstream data, a time-sequenced set of web pages visited by the user, assigning each web page in the time-sequenced set of web pages visited by the user to a group based upon a timestamp of when the user visited the web page, generating a vector representation of the web pages assigned to each group, and executing a prediction model using the vector representations as input to generate one or more predicted needs of the user. The server computing device identifies one or more virtual assistant messages for the user based upon the predicted needs of the user. The server computing device displays the identified virtual assistant messages in a virtual assistant application on the client computing device.

The invention, in another aspect, features a computerized method of automated predictive virtual assistant intervention. The system comprises a server computing device with a memory for storing computer-executable instructions and a processor that executes the computer-executable instructions. The server computing device captures clickstream data corresponding to one or more web browsing sessions between a client computing device of a user and one or more web servers. The server computing device generates one or more predicted needs of the user based upon the clickstream data, comprising: creating, from the clickstream data, a time-sequenced set of web pages visited by the user, assigning each web page in the time-sequenced set of web pages visited by the user to a group based upon a timestamp of when the user visited the web page, generating a vector representation of the web pages assigned to each group, and executing a prediction model using the vector representations as input to generate one or more predicted needs of the user. The server computing device identifies one or more virtual assistant messages for the user based upon the predicted needs of the user. The server computing device displays the identified virtual assistant messages in a virtual assistant application on the client computing device.

Any of the above aspects can include one or more of the following features. In some embodiments, the time-sequenced set of web pages visited by the user comprises an identifier for each web page and the timestamp of when the user visited the web page. In some embodiments, the identifier for each web page comprises a page name. In some embodiments, generating a vector representation of the web pages assigned to each group comprises: converting the page name for each web page in the group to a page embedding; determining a weight value for each web page in the group based upon a significance of the page name in the set of web pages; and aggregating the page embedding and the weight value for the web pages assigned to each group into a vector representation of the web pages assigned to the group.

In some embodiments, the server computing device augments the vector representation with profile data of the user prior to executing the prediction model. In some embodiments, the profile data of the user comprises one or more of interaction history information, demographic information, transaction history information, account information, or a current time of interaction. In some embodiments, the predicted needs of the user comprise one or more granularity levels. In some embodiments, the one or more predicted needs of the user are compared to one or more needs of a plurality of other users at the time of prediction to update the one or more predicted needs of the user. In some embodiments, updating the one or more predicted needs of the user comprises re-ordering the one or more predicted needs of the user based upon a ranking of the one or more needs of the plurality of other users at the time of prediction.

In some embodiments, the server computing device activates the virtual assistant application in a browser window of the client computing device and displays the identified virtual assistant messages in the virtual assistant application. In some embodiments, the server computing device automatically activates the virtual assistant application during an ongoing web browsing session. In some embodiments, the server computing device determines a user intent based upon one or more input messages received from the client computing device and identifies one or more virtual assistant messages for the user based upon (i) the predicted needs of the user and (ii) the user intent. In some embodiments, the user at the client computing device interacts with one or more of the virtual assistant messages to receive information.

Other aspects and advantages of the invention will become apparent from the following detailed description, taken in conjunction with the accompanying drawings, illustrating the principles of the invention by way of example only.

BRIEF DESCRIPTION OF THE DRAWINGS

The advantages of the invention described above, together with further advantages, may be better understood by referring to the following description taken in conjunction with the accompanying drawings. The drawings are not necessarily to scale, emphasis instead generally being placed upon illustrating the principles of the invention.

DETAILED DESCRIPTION

Figure 1:
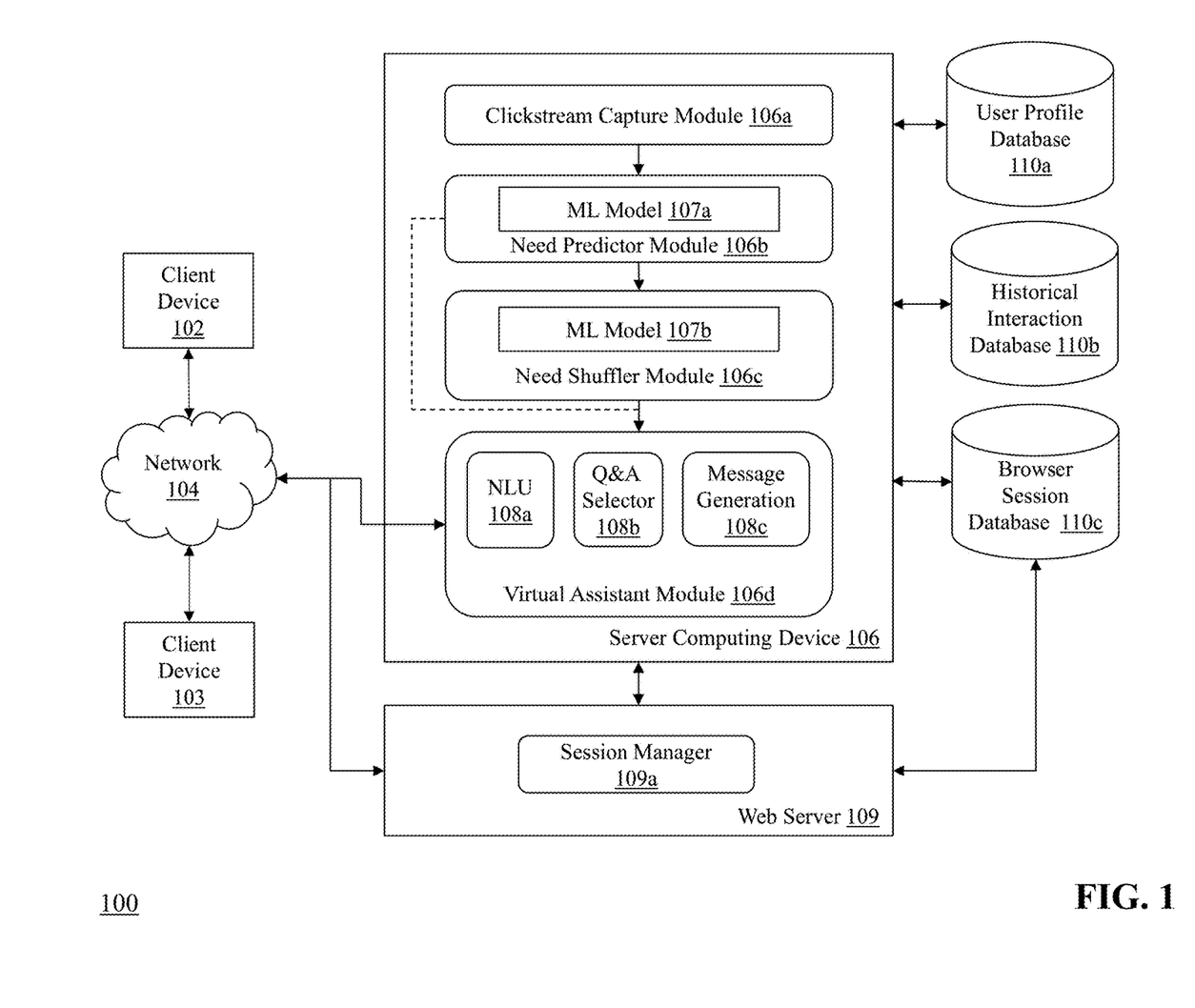
FIG. 1 is a block diagram of a system for automated predictive virtual assistant (VA) intervention in real time.

FIG. 1 is a block diagram of a system 100 of automated predictive virtual assistant (VA) intervention in real time. System 100 includes client computing device 102, client computing device 103, communication network 104, server computing device 106 that includes clickstream capture module 106a, need predictor module 106b with machine learning (ML) model 107a, need shuffler module 106c with ML model 107b, virtual assistant (VA) module 106d with natural language understanding (NLU) module 108a, question-and-answer (Q&A) selector module 108b, and message generation module 108c. System 100 further comprises web server computing device 109 that includes session manager 109a. System 100 also comprises a plurality of databases—including user profile database 110a, historical interaction database 110b, and browser session database 110c.

Client computing devices 102, 103 connect to communication network 104 in order to communicate with web server 109 to participate in one or more web browsing sessions. As can be appreciated, web server 109 can be configured to host one or more websites and/or connect to other computing devices that provide web-related content to client computing devices 102, 103. For example, client computing devices 102, 103 can establish a communication session with session manager 109a of web server 109 (e.g., via HTTP or HTTPS) using a uniform resource locator (URL) assigned to web server 108 and receive website content from web server 109. A user at client computing device 102, 103 can interact with (e.g., browse) the website by activating links and navigating through various pages of the website. In some embodiments, each page or section of the website is associated with a particular URL. In some embodiments, client computing devices 102, 103 are each coupled to an associated display device (not shown). For example, client computing devices 102, 103 can provide a graphical user interface (GUI) via the display device that is configured to receive input from a user of the corresponding device 102, 103 and to present output (e.g., website content) to that user. In some embodiments, client computing devices 102, 103 can be configured to connect to server computing device 106 via network 104.

Exemplary client computing devices 102, 103 include but are not limited to desktop computers, laptop computers, tablets, mobile devices, smartphones, and internet appliances. It should be appreciated that other types of computing devices that are capable of connecting to the components of the system 100 can be used without departing from the scope of invention. Although FIG. 1 depicts two client computing devices 102, 103, it should be appreciated that system 100 can include any number of client computing devices.

Communication network 104 enables client computing devices 102, 103 to communicate with the web server 109. Network 104 is typically a wide area network, such as the Internet and/or a cellular network. In some embodiments, network 104 is comprised of several discrete networks and/or sub-networks (e.g., cellular to Internet).

Server computing device 106 is a device including specialized hardware and/or software modules that execute on a processor and interact with memory modules of server computing device 106, to receive data from other components of system 100, transmit data to other components of system 100, and perform functions for automated predictive virtual assistant intervention in real time as described herein. Server computing device 106 includes clickstream capture module 106a, need predictor module 106b, need shuffler module 106c, and virtual assistant module 106d that execute on the processor of the server computing device 106. As mentioned above, need shuffler module 106c includes machine learning model 107 and virtual assistant module 106d includes NLU module 108a, Q&A selector module 108b, and message generation module 108c. In some embodiments, modules 106a-106d, model 107, and modules 108a-108c are specialized sets of computer software instructions programmed onto one or more dedicated processors in server computing device 106 and can include specifically-designated memory locations and/or registers for executing the specialized computer software instructions.

Although modules 106a-106d, models 107a-107b, and modules 108a-108c are shown in FIG. 1 as executing within the same server computing device 106, in some embodiments the functionality of modules 106a-106d, models 107a-107b, and modules 108a-108c can be distributed among a plurality of server computing devices. As shown in FIG. 1, server computing device 106 enables modules 106a-106d, models 107a-107b, and modules 108a-108c to communicate with each other in order to exchange data for the purpose of performing the described functions. It should be appreciated that any number of computing devices, arranged in a variety of architectures, resources, and configurations (e.g., cluster computing, virtual computing, cloud computing) can be used without departing from the scope of the invention. Exemplary functionality of modules 106a-106d, models 107a-107b, and modules 108a-108c is described in detail throughout the specification.

In some embodiments, machine learning models 107a-107b are artificial intelligence frameworks configured to receive aggregated clickstream feature embeddings (that are representative of user clickstream activity) as input and generate a prediction of user need based upon the aggregated clickstream feature embeddings that is then used by the VA module 106d to intervene in the user's session. For example, machine learning models 107a-107b can comprise one or more machine learning frameworks or algorithms that are executed on the clickstream feature embeddings to determine predictions of user need based upon the input. Exemplary machine learning frameworks and algorithms can include, but are not limited to, nearest neighbor, logistic regression, ridge regression, Random Forest, extra trees, ensemble voting classification, stacked classification, gradient boosting on decision trees (e.g., CatBoost available from catboost.ai, LightGBM available from Microsoft Corp., XGBoost available from xgboost.ai), feed forward neural networks (e.g., multilayer perceptron (MLP)), and others. As can be appreciated, machine learning models 107a-107b can be trained on existing clickstream activity data and correlated known user actions in order to enhance the accuracy of the prediction values generated by models 107a-107b. Also, as additional clickstream data and related subsequent user actions are collected by system 100 over time, this additional data can be used to re-train embedding models 107a-107b for a further increase in accuracy and performance. In some embodiments, machine learning model 107a generates predicted user needs at multiple granularities (e.g., questions, subtopics, topics, etc.) based upon clickstream embeddings and related user profile/demographic data, while machine learning model 107b re-orderes the predicted user needs generated by model 107a based upon current trends in the needs of all users interacting with a virtual assistant (e.g., VA module 106d). For example, model 107b can take in distribution of current needs and probability distribution of predicted needs to produce re-ordered predicted needs that improves the accuracy and efficiency of the actions generated from the predicted user needs. In some embodiments, the predicted user needs are not re-ordered by model 107b—instead, the predicted user needs are transmitted from need predictor module 106b to virtual assistant module 106d for taking action in response to the needs.

As can be appreciated, need prediction data generated by model 107a is actionable and can be utilized by other components of system 100 to interface with client computing devices 102, 103 and/or other devices (not shown) in a manner that leverages the insight gained through the prediction. For example, model 107a may analyze a clickstream feature embedding for activity data associated with a particular user and predict that the user is likely to need information about opening an account in the near future. In response to this insight, server computing device 106 can instruct VA module 106d to proactively intervene into the client web session and invoke a VA instance on client computing device 102, 103 of the user to provide useful information in response to the user need. In this instance, exemplary information can comprise Q&A information about opening an account (e.g., frequently asked questions, contact information, etc.). In another example, model 107a may predict that the user is likely to need an in-person or virtual appointment with a customer service representative in the next thirty days. In response, server computing device 106 can instruct VA module 106d to proactively intervene into the client web session and invoke a VA instance on client computing device 102, 103 of the user to provide useful information, such as hours and locations of nearby branch offices or contact information for virtual representatives.

Web server 109 is a computing device (or set of computing devices) to which client computing devices 102, 103 can connect to retrieve and display digital content items (such as web pages). Web server 109 is a combination of hardware, including one or more special-purpose processors and one or more physical memory modules, and specialized software modules (such as session manager 109a) that are executed by a processor of web server 109. Typically, a website comprises a plurality of visual and non-visual elements that make up the content transmitted and displayed to a user when, e.g., browser software on client computing devices 102, 103 connects to web server 109 via communication network 104 (e.g., Internet) and requests content from the website. The elements of a website include, but are not limited to, webpages (e.g., HTML documents), image files, layouts, color sets, stylesheets, document object models (DOM), tracking elements, metadata, URLs, and content (e.g., text, audio, video). As can be understood, in some embodiments each page of a website is associated with a particular URL that identifies the page's location and provides a mechanism for retrieving the page for display on client computing devices 102, 103. Session manager 109a is configured to establish browsing sessions with client computing devices 102, 103 and record session-related information (such as pages visited, URLs accessed, timestamps, page sequencing, and the like) for each user/client device. In some embodiments, session manager 109a records the browsing session information in browser session database 110c.

Databases 110a-110c are located on a computing device (or in some embodiments, on a set of computing devices) coupled to server computing device 106 and/or web server 109 and databases 110a-110c are configured to receive, generate, and store specific segments of data relating to the process of automated predictive virtual assistant intervention in real time as described herein. In some embodiments, all or a portion of databases 110a-110c can be integrated with server computing device 106, web server 109, or be located on a separate computing device or devices. Databases 110a-110c can comprise one or more databases configured to store portions of data used by the other components of system 100 as will be described in greater detail below.

In some embodiments, user profile database 110a comprises user profile information for a plurality of users of system 100; typically, each user is associated with one or more client computing devices 102, 103. User profile information can include, but is not limited to, identification information (e.g., user identifiers, account numbers) demographic information, financial information, device information (e.g., IP address, MAC address, etc. of client computing device 102, 103), historical interaction information (e.g., purchases, transactions, events), and the like.

In some embodiments, historical interaction database 110b comprises historical user interaction/user event data that may be correlated to user profiles as stored in user profile database 110a and certain web browsing activity as stored in browser session database 110c. Generally, historical interaction database 110b can comprise information about prior actions of users (e.g., purchases, requests for information, appointments, account setup, transactions, customer service interactions, etc.) that may be relevant to the user's clickstream and web browsing history. For example, a user that accessed URLs relating to password reset instructions, online account activation FAQs, and other similar topics during a web browsing session may not have been able to find the information they were seeking. As a result, within a short time (e.g., 10 minutes) after participating in the web browsing session, the user may call a customer service center or initiate a virtual support chat session. Therefore, the specific URLs accessed by the user during the web browsing session may be associated with a strong likelihood of subsequent customer service interactions (e.g., calls, web chats, etc.). In certain instances, historical data about clickstreams and related known user events (also called a training set) can be provided as input to train machine learning model 107 so that model 107 can generate predictions of future user events—where subsequent input to the model 107 comprises clickstream data for live or recently-concluded web browsing sessions conducted by other users. Further information about training and execution of machine learning model 107 is provided later in the specification.

In some embodiments, browser session database 110c comprises browsing information for web sessions established between client computing devices 102, 103 and web server 108. Browsing information can include, but is not limited to, user identifiers, session metadata (e.g., device identifiers, network information, browser type), URLs, timestamps, and the like. As an example, for each webpage that a particular user visits during a web session, browser session database 110c can store data such as the URL(s) accessed, a timestamp when a corresponding URL was accessed, an identifier of the user and/or client computing device 102, 103 on which the URL was accessed, and a response from the user and/or client computing device 102, 103 with respect to the webpage (e.g., interaction, view time, scroll time, etc.).

Figure 2:
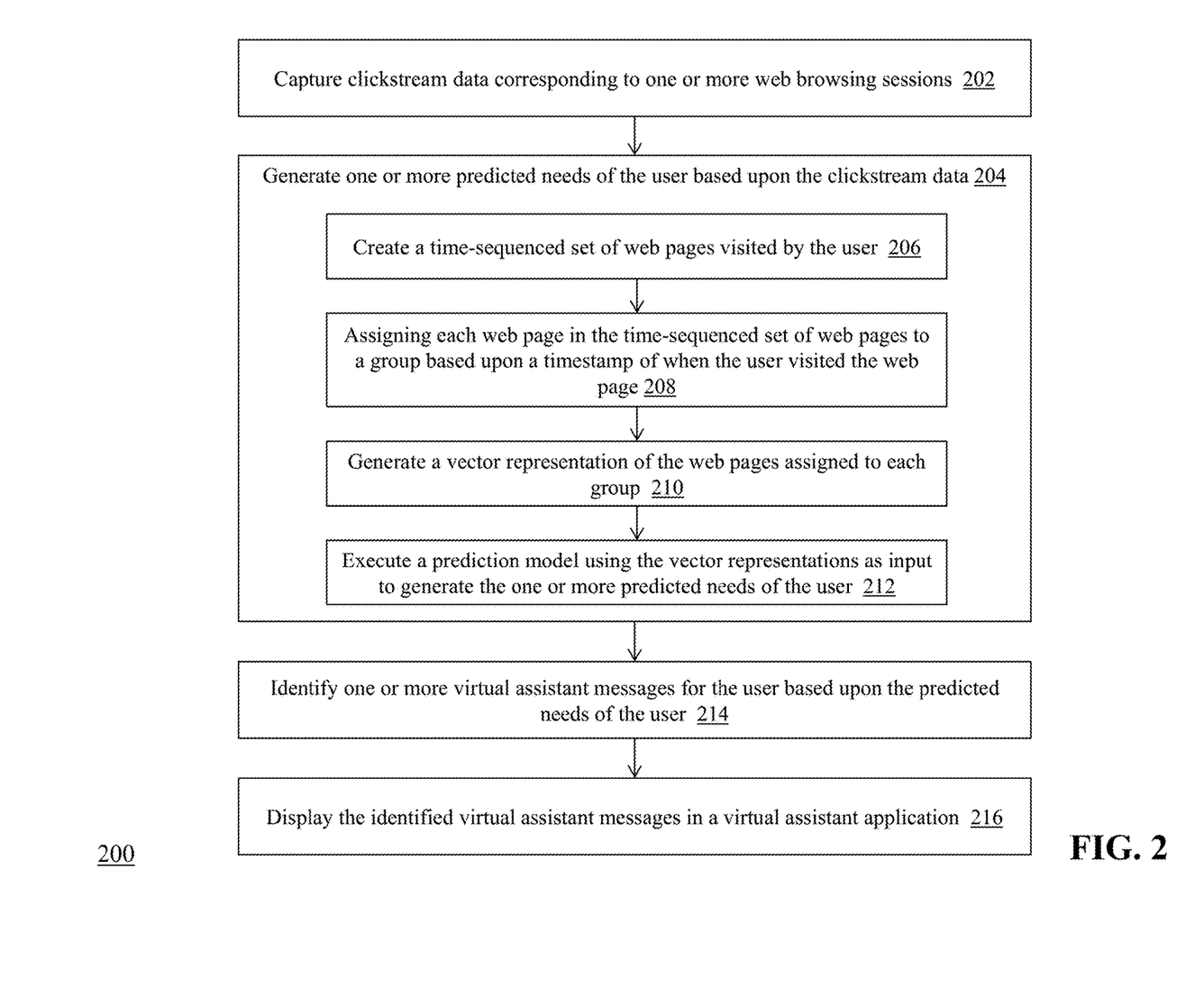
FIG. 2 is a flow diagram of a computerized method of automated predictive virtual assistant (VA) intervention in real time.

FIG. 2 is a flow diagram of a computerized method 200 of automated predictive virtual assistant (VA) intervention in real time, using the system 100 of FIG. 1. As mentioned above, users at one or more client computing devices 102, 103 participate in web browsing sessions with web server 109 and session manager 109a records relevant web browsing information, such as user identifiers, timestamps, URLs accessed, and the like. Session manager 109a transmits the web browsing information to browser session database 110b for storage. Clickstream capture module 106a of server computing device 106 captures (step 202) clickstream data corresponding to one or more web browsing sessions from, e.g., browser session database 110b. In some embodiments, module 106a can retrieve web browsing session data from database 110b periodically (e.g., via a batch job, push and/or pull mechanisms, or other similar data retrieval techniques). In other embodiments, module 106a can receive web browsing session data in real time or near real time (e.g., as client computing devices 102, 103 are establishing and conducting web browsing sessions with web server 109).

Figure 3:
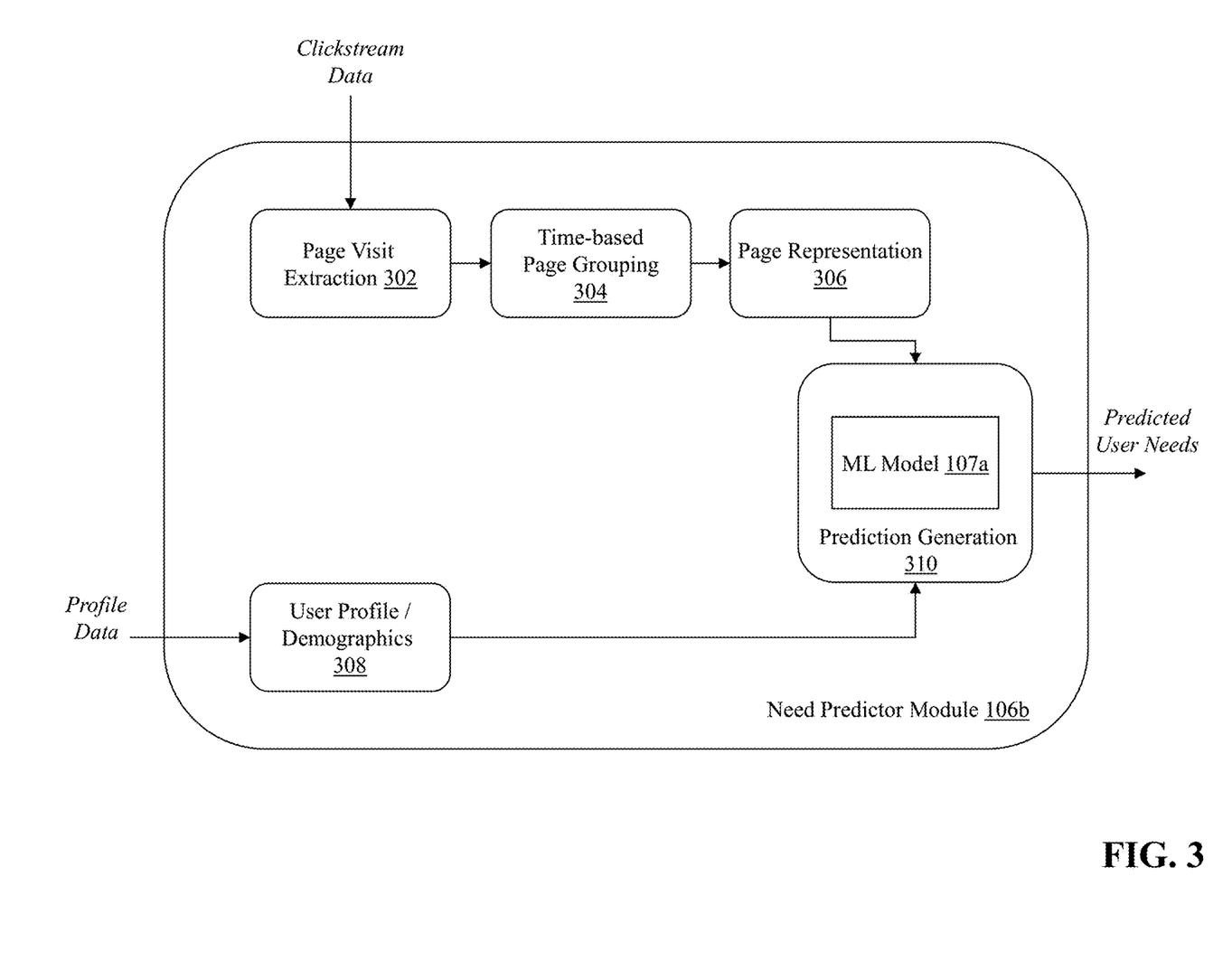
FIG. 3 is a detailed block diagram of need predictor module for generating predicted needs of the user.

After capturing the clickstream data, need predictor module 106b of server computing device 106 generates (step 204) one or more predicted needs of the user based upon the clickstream data. FIG. 3 is a detailed block diagram of need predictor module 106b for generating predicted needs of the user. As shown in FIG. 3, need predictor module 106b includes several functional modules 302, 304, 306, 308, and 310 that receive data from other components of system 100 and generates predicted user needs. Page visit extraction module 302 receives clickstream data relating to a user from browser session database 110c via clickstream capture module 106a. In some embodiments, the clickstream data corresponds to a defined time period (such as all clickstream activity by the user for the past 48 hours).

Page visit extraction module 302 creates (step 206) a time-sequenced set of web pages visited by the user. First, module 302 extracts a list of webpages visited by the user during the defined time period along with a timestamp corresponding to each page visit. In some embodiments, the list of webpages comprises all or a portion of a URL for each page visited. In some embodiments, the list of webpages comprises an identifier or other indicia for each page visited. Page visit extraction module 302 generates a clickstream matrix comprising a unique identifier for the user (e.g., UserID) and the list of webpages visited and corresponding timestamps. Page visit extraction module 302 transmits the clickstream matrix to time-based page grouping module 304, which groups the visited webpages based upon the associated timestamps.

Figure 4:
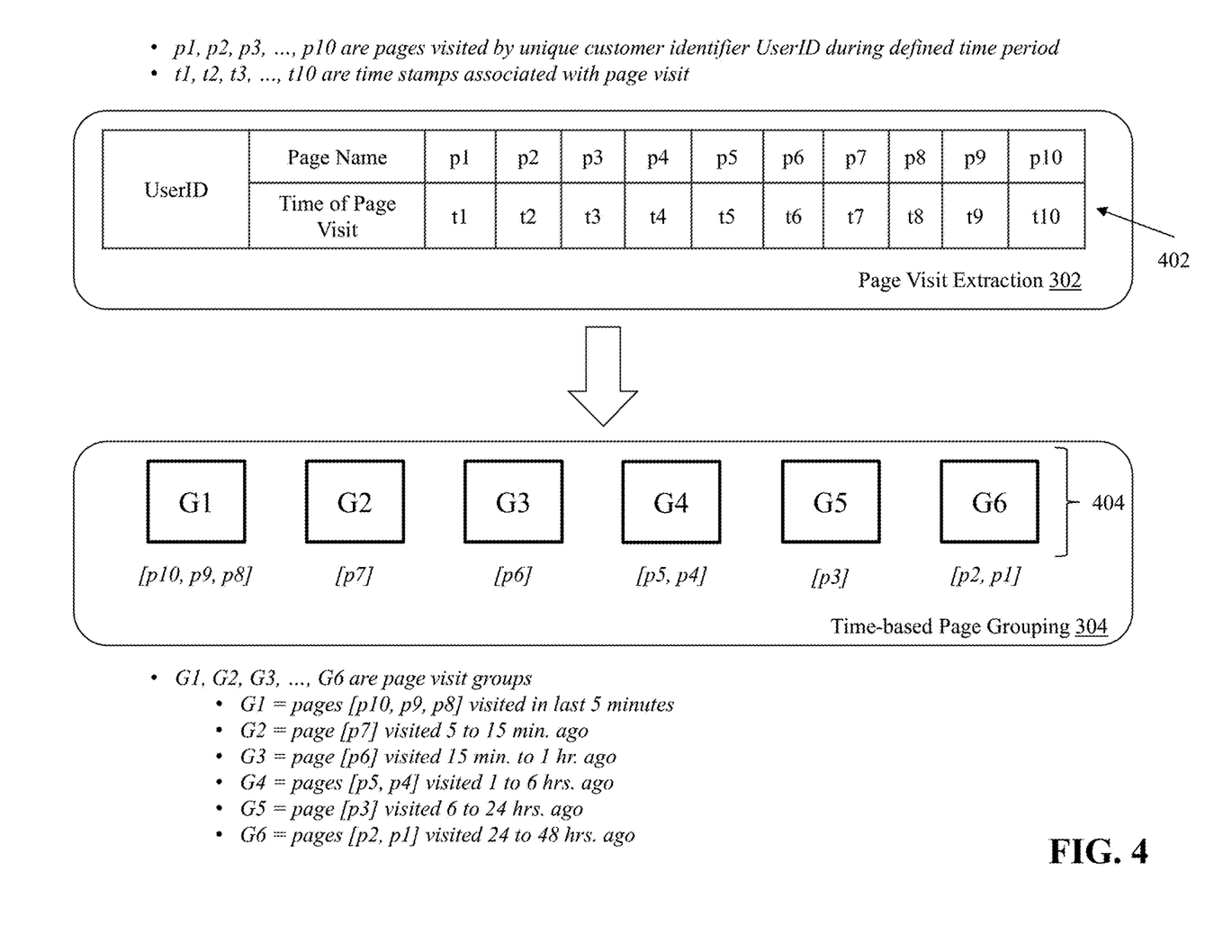
FIG. 4 is a diagram of a clickstream matrix generated by page visit extraction module and transmitted to time-based page grouping module for creation of page visit groups.

FIG. 4 is a diagram of a clickstream matrix 402 generated by page visit extraction module 302 and transmitted to time-based page grouping module 304 for creation of page visit groups 404. As shown in FIG. 4, clickstream matrix 402 comprises the unique identifier for the user (UserID) and a mapping of visited pages (p1, p2, . . . ) to timestamps (t1, t2, . . . ). Upon receiving the clickstream matrix from page visit extraction module 302, time-based page grouping module 304 assigns (step 208) each web page in the time-sequenced set of web pages to a group (G1, G2, . . . ) based upon a timestamp of when the user visited the webpage. The page visit groups can correspond to defined time windows and each visited page is allocated to a particular page visit group based upon the timestamp. For example, group G1 can be configured to contain pages that were visited by the user in the last five minutes. In this example, the timestamp for each of the pages [p10, p9, p8] falls within this time window, so module 304 assigns these pages to group G1. The remaining webpages in the list are similarly assigned to groups based upon their corresponding timestamps, as shown in FIG. 4. While the example shown in FIG. 4 comprises ten webpages and six page visit groups, it should be appreciated that this is merely illustrative and other embodiments can comprise any number of webpages visited by the user during the defined time period and any number of page visit groups with particular time windows can be utilized.

Figure 5:
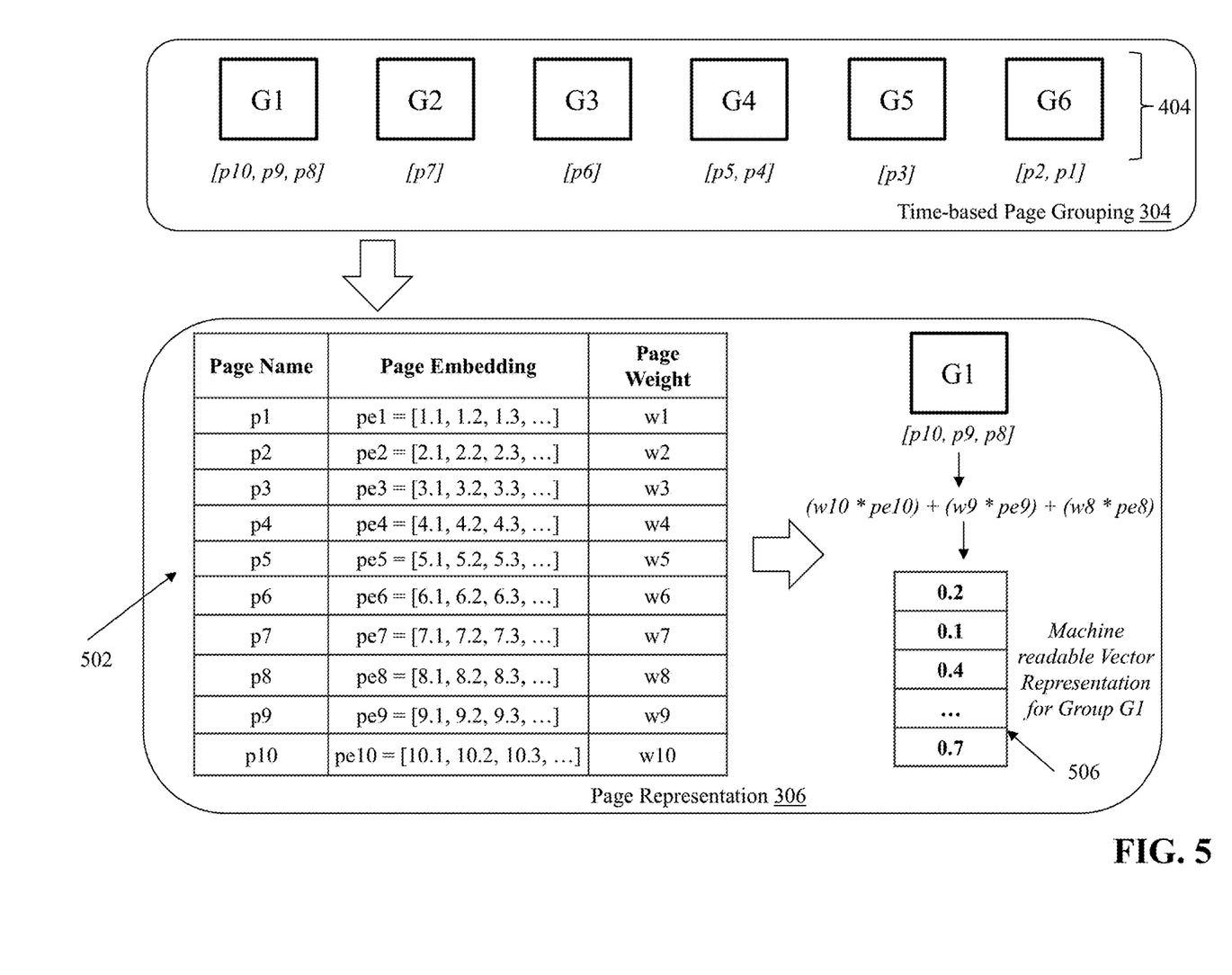
FIG. 5 is a diagram of a weighted page embedding matrix generated by page representation module from the page visit group data.

Once the page visit groups are created, page representation module 304 generates (step 210) vector representations of the web pages assigned to each group using a weighted aggregation algorithm for the pages assigned to the respective page visit groups. FIG. 5 is a diagram of a weighted page embedding matrix 502 generated by page representation module 306 from the page visit group data 404. As shown in FIG. 5, page representation module 306 receives the page visit groups 404 from time-based page grouping module 304. Page representation module 306 then generates the weighted page embedding matrix 502 from the group data. Matrix 502 comprises, for each visited page across all groups, a page embedding pe1, pe2, (i.e., a numeric representation of webpage names) received from an external page embedding module (not shown) and a page weight w1, w2, (i.e., a value representing the significance of the page name in the entire corpus of webpages. In some embodiments, the page embeddings pe1, pe2, . . . comprise multidimensional vectors generated from the page names.

Also, in some embodiments page representation module 304 repurposes one or more natural language processing (NLP) techniques to compute the page embeddings from a corpus of web sessions. For example, a web session consists of a sequence of pages visited by a customer in a single browsing session. An example of a web session is: [p3, p4, p5, p2], e.g. the customer visited page p3, followed by pages p4, p5 and p2 in a browsing session. A collection of web sessions from all customers yields a corpus of web sessions where each session is represented by such sequence(s) of pages. As can be appreciated, there is a similarity between the above-referenced 'sequence of pages in a web session' and a 'sequence of words in a sentence' as utilized in typical NLP vectorization algorithms (e.g., Word2Vec, Long Short-Term Memory (LSTM) neural network with classification layer, etc.). Thus, techniques which are generally used to find embeddings of words from a corpus of documents can be employed by page representation module 304 to learn embeddings of pages from the corpus of web sessions. In some embodiments, page representation module 304 utilizes unsupervised approaches like Word2Vec (www.tensorflow.org/tutorials/text/word2vec) and/or supervised approaches like LSTM.

Figure 6:
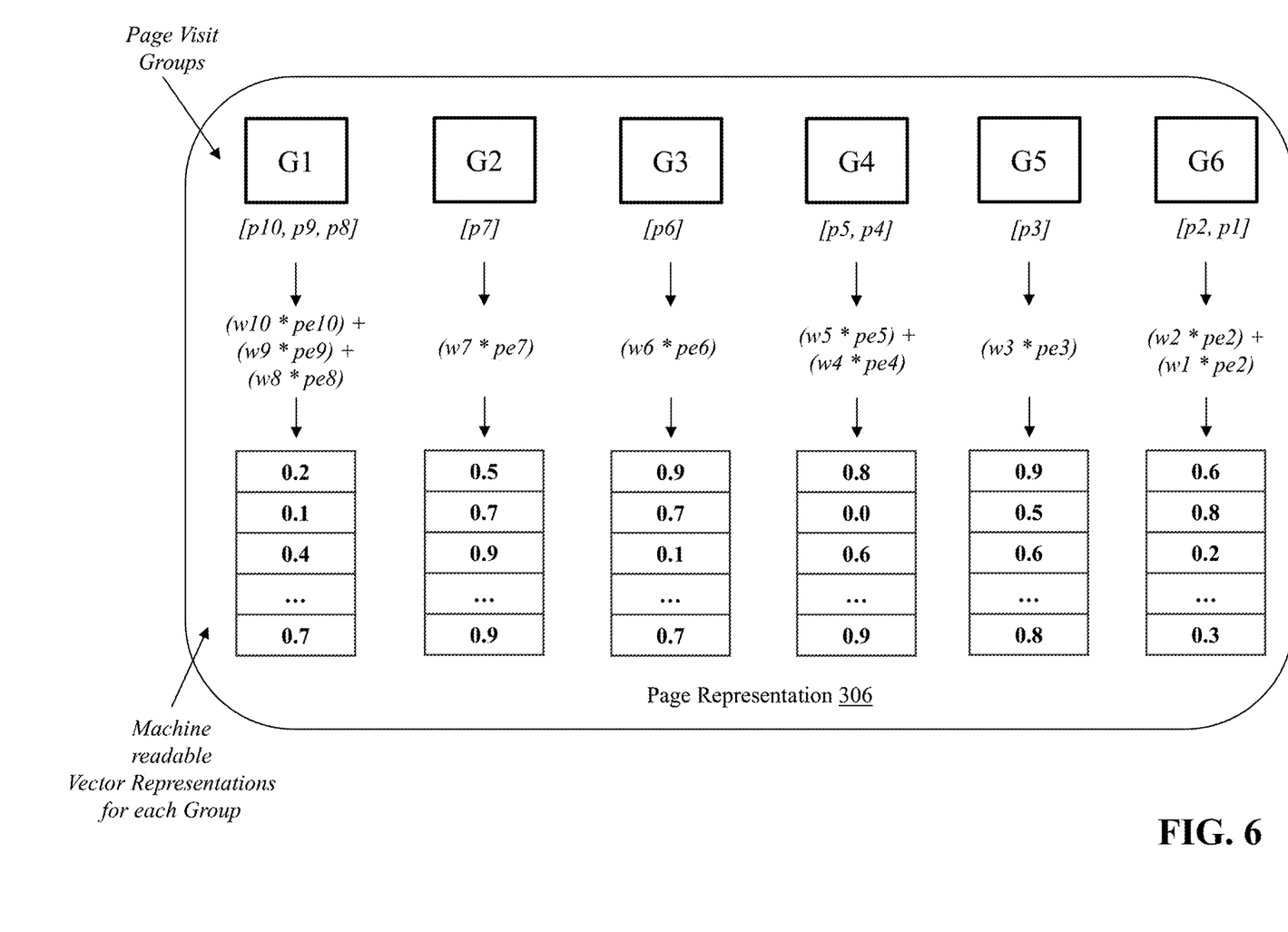
FIG. 6 is a diagram showing the weighted aggregation algorithm executed by page representation module for each page visit group to generate the corresponding machine-readable vector representation.

Once page representation module 306 has created the page embedding matrix 502, module 306 generates a machine-readable vector representation for each page visit group G1, G2, . . . using the matrix 502 (e.g., vector 506 for group G1). For example, group G1 comprises webpages p10, p9, p8. Page representation module 306 uses a weighted aggregation algorithm to generate the vector representation for this group as follows:

$$(w10*pe10)+(w9*pe9)+(w8*pe8)$$

where w(n) is the weight assigned to the webpage and pe(n) is the page embedding for the webpage. Module 306 executes the weighted aggregation algorithm for each page visit group G1, G2, . . . , which results in a machine-readable vector representation for each group. FIG. 6 is a diagram showing the weighted aggregation algorithm executed by page representation module 306 for each page visit group to generate the corresponding machine-readable vector representation.

Figure 7:
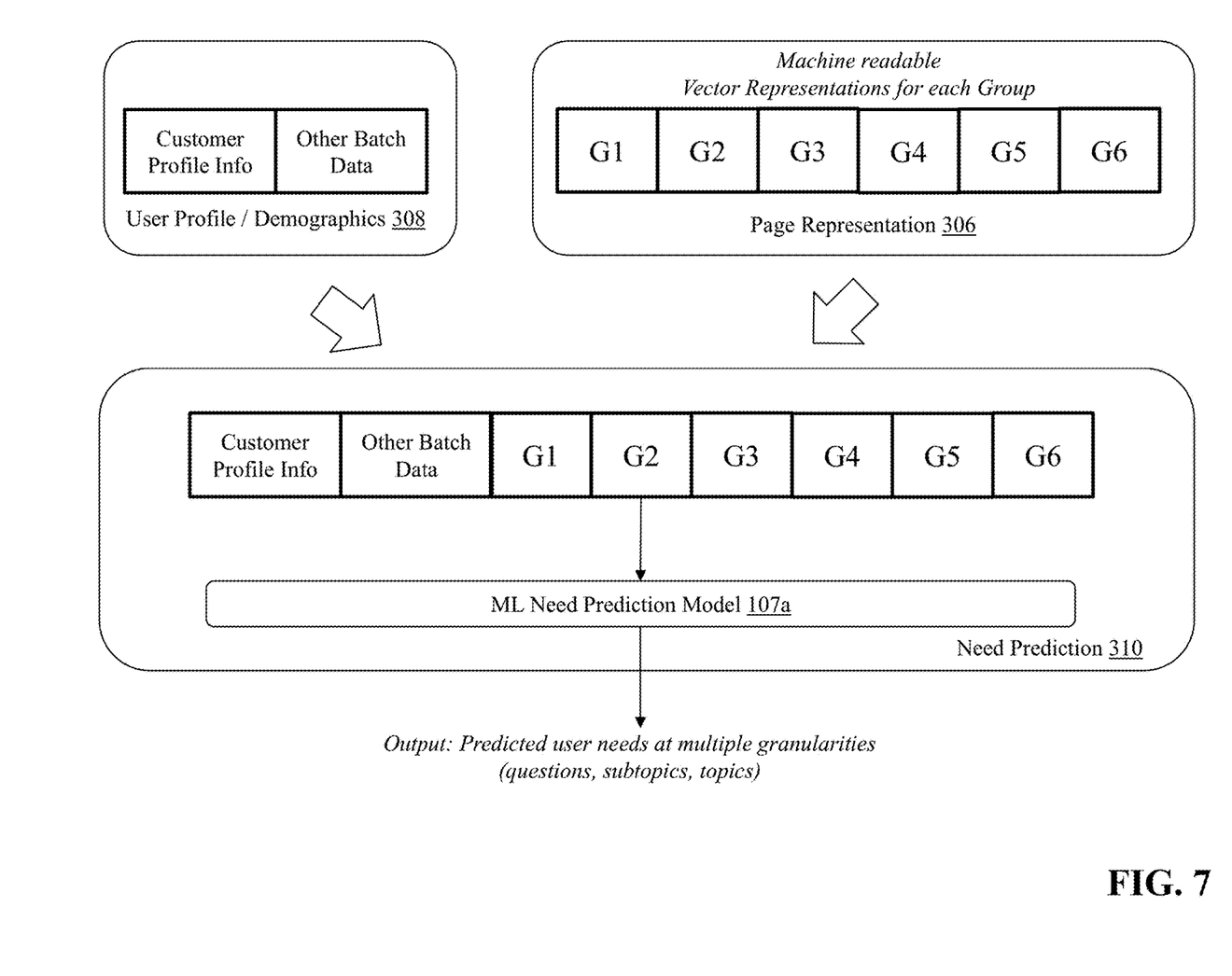
FIG. 7 is a diagram showing the aggregation of user clickstream attributes and user profile attributes for input to machine learning need prediction model.
Figure 8:
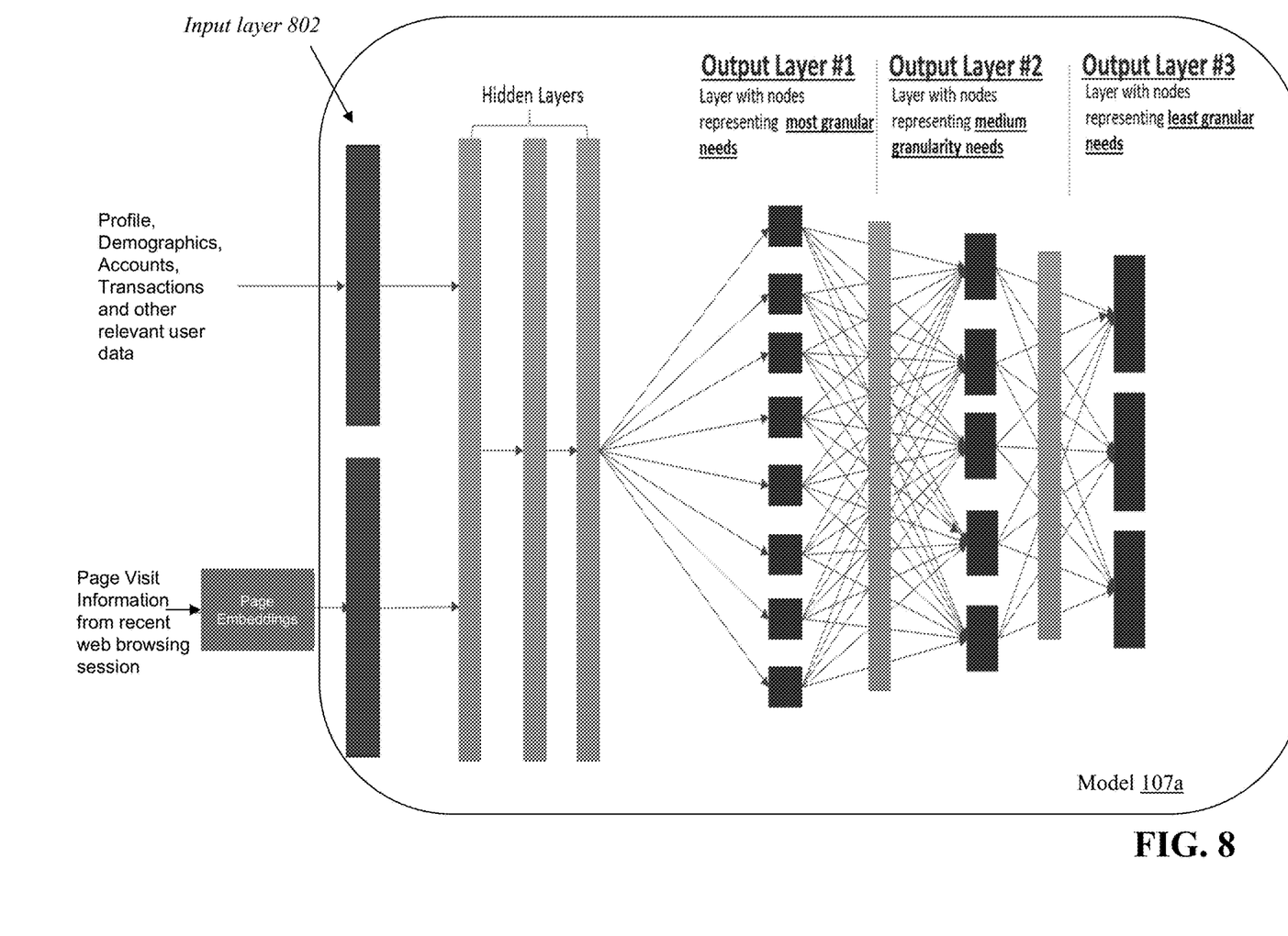
FIG. 8 is a diagram of an exemplary model structure of the feed forward neural network used by need prediction model.

Turning back to FIG. 3, user profile/demographics module 308 of need predictor module 106b retrieves user profile data, demographics, and other relevant user data from databases 110a-110c and provides the retrieved data to prediction generation module 310. In some embodiments, module 308 retrieves data such as profile information, interaction history, demographics, transactional attributes, and other information that may be defined as relevant to predicting user needs. Prediction generation module 310 combines the user profile data received from user profile/demographics module 308 with the machine-readable vector representations for each group (as generated by module 306) to create a machine-readable aggregation of user clickstream attributes and user profile attributes that is then used as input to execute (step 212) a machine learning need prediction model 107a to generate the predicted user needs. FIG. 7 is a diagram showing the aggregation of user clickstream attributes and user profile attributes for input to ML need prediction model 107a. In some embodiments, need prediction model 107a comprises an artificial intelligence algorithm such as a recursive neural network (RNN), a convolutional neural network (CNN), or other type of neural network architecture that comprises a plurality of layers (e.g., input layer, one or more hidden layers, output layer) configured to receive as input the machine-readable aggregation of user clickstream attributes and user profile attributes for a given user, and generate one or more predicted user needs based upon the machine-readable aggregation— that is, the model is configured to determine (or predict) a relationship between the features and/or attributes of the input vector representation and the corresponding user needs that had been generated. Generally, the model is measured by how accurately it can predict the output from the corresponding input—a less accurate model can be retrained using the same training data (and/or additional training data) in order to refine the model and make it more accurate. In some embodiments, the model is a feed forward neural network with several output layers, one for each granularity of need. FIG. 8 is a diagram of an exemplary model structure of the feed forward neural network used by need prediction model 107a. As shown in FIG. 8, the input layer 802 of model 107a receives as input the profile, demographics, accounts, transactions and other relevant user data, and also receives the page embeddings. The model 107a processes the data through a plurality of hidden layers 804 and provides for a plurality of output layers 806, where output layer 1 ($O_1$) is a layer with nodes representing most granular needs, output layer 2 ($O_2$) is a layer with nodes representing medium granularity needs, and output layer 3 ($O_3$) is a layer with nodes representing least granular needs. Output layer 1 ($O_1$) feeds to the subsequent output layers 2 and 3 to predict needs at coarser granularity. In some embodiments, model 107a training is performed in sequential fashion with weights of layers up to $O_i$ frozen when training for output layer $O_{i+1}$.

In some embodiments, need prediction model 107a produces predicted needs at multiple granularities (e.g., questions, subtopics, topics). This enables VA module 106d to take specific, focused action in response to the predicted user needs based upon the different granularities. For example, model 107a may predict that a user is looking to answer a specific question based upon the clickstream data and user profile data. Model 107a can provide this prediction to VA module 106d, which generates a tailored response containing the answer to that question for display to the user. Further detail about the operation of the VA module 106d after receiving predicted user needs is provided in later sections of the specification.

In some embodiments, need predictor module 106b generates the predicted user needs according to a ranking or hierarchy. For example, module 106b may determine that certain predicted needs are more likely or more probable than others, and order the needs accordingly so that the more likely needs can be addressed first or be given a higher priority for action. In some cases, system 100 can opt to re-order the predicted needs for a user based upon, e.g., current trends in needs of other customer using the virtual assistant channel. By reordering the user's specific needs based upon current trends, need shuffler module 106c can enhance the likelihood of providing useful information based upon the predicted user needs. In some embodiments, need predictor module 106b transmits the predicted user needs to need shuffler module 106c, which re-orders the predicted user needs using machine learning model 107b, that is trained according to predicted needs and corresponding feedback collected from other users. ML model 107b can be an artificial intelligence algorithm that receives as input a distribution of current needs of all users and a probability distribution of predicted needs to generate re-ordered predicted needs for the user.

In some embodiments, need shuffler module 106c takes in two sets of features: 1) Scores for all needs from need predictor module 106b— this is the output of need predictor module (e.g., For n needs, this would result in an n-dimensional feature vector); and 2) Needs from a plurality of users at the time of prediction—the proportion of all interactions belonging to each need category in last t hours before the time of prediction are collected (e.g., 24 hours can be used as the value of t, however one may use different values without limiting the technology described herein). For n needs, this would also result in an n-dimensional feature vector with each value representing the proportion of interactions of a need category in last t hours across a plurality of users. Relative proportions of each need gives information on what is trending on the interaction channel across a plurality of users and, when used along with scores of needs from need predictor module 106b, can help better predict needs for a given customer. In some embodiments, scores from need predictor module 106b for a specific customer are concatenated with proportions of needs across a plurality of users to result into a 2n dimensional vector where n represents the number of category of needs. This serves as input to need shuffler module 106c which can be modeled as a shallow feed forward neural network to produce adjusted scores of each need. It should be appreciated that need shuffler module 106c is optional, and in some embodiments need predictor module 106b transmits the predicted user needs at multiple granularities directly to virtual assistant (VA) module 106d for processing.

Once the predicted user needs have been determined, VA module 106d can utilize the predictions to, e.g., with a newly-created and/or ongoing user VA session to identify (step 214) one or more virtual assistant messages for the user and display (step 216) the identified messages in a virtual assistant application on client device 102, 103. In this way, module 106d provides insights and information specifically responsive to the need predictions for the user. It should be appreciated that VA module 106d can utilize the predictions in several different ways, including: (i) to intervene in an existing user browsing session to display information relevant to the need predictions and (ii) to classify a user's intent for an incoming VA request based upon the generated need predictions in order to provide the user with information relevant to that intent.

Sense and Intervene

As mentioned above, a user's clickstream data may indicate that the user is searching for particular information or has a particular service need. The user may visit specific webpages (once, or perhaps multiple times) but be unable to find the information or answers that satisfy the user's query. In these cases, the user may eventually give up the search, and decide to call or email a customer service center to connect with a live representative. In order to reduce the volume of such interactions (which can be inefficient, time-consuming, and costly for enterprises), system 100 can be implemented to intervene in the user's browsing session by automatically launching a VA application (e.g., a pop-up or chatbox) on client device 102, 103 while the user is browsing, in order to provide information that is relevant to the user's predicted needs Generally, client device 102, 103 executes a browser application or other type of user interface software to establish a connection to one or more web servers (e.g., web server 109) and browse webpages made available by the web servers. During this activity, session manager 109a captures the user's browsing data (including clickstream activity) and stores the data in database 110c. As described previously, server computing device 106 can analyze the clickstream data in real time during the user's browsing session (including analysis of historical browsing activity and user profile/demographic information) to generate one or more predicted needs of the user. Upon receiving the predicted needs, VA module 106d can connect to session manager 109a of web server 109 to intervene in the web browsing session. For example, VA module 106d can instruct web server 109 to launch a VA application on client device 102, 103 and then begin a VA communication session between client device 102, 103 and VA module 106d. When the intervention occurs, the user at client device 102, 103 may be presented with a visual alert directing the user's attention to a portion of the user interface that contains the virtual assistant. As can be appreciated, VA modules typically operate with defined grammar (such as sets of questions and related answers) that are provided to a user. In this instance, Q&A module 108b of VA module 106d can analyze the predicted user needs and retrieve one or more question-and-answer sets that are defined as relating to or otherwise responsive to the predicted needs. For example, each Q&A set may be mapped to one or more predicted needs generated by need predictor module 106b. Q&A module 108b can retrieve the responsive Q&A sets based upon the mapping and present one or more of the Q&A sets in the virtual assistant area of the user interface on client device 102, 103.

Figure 9:
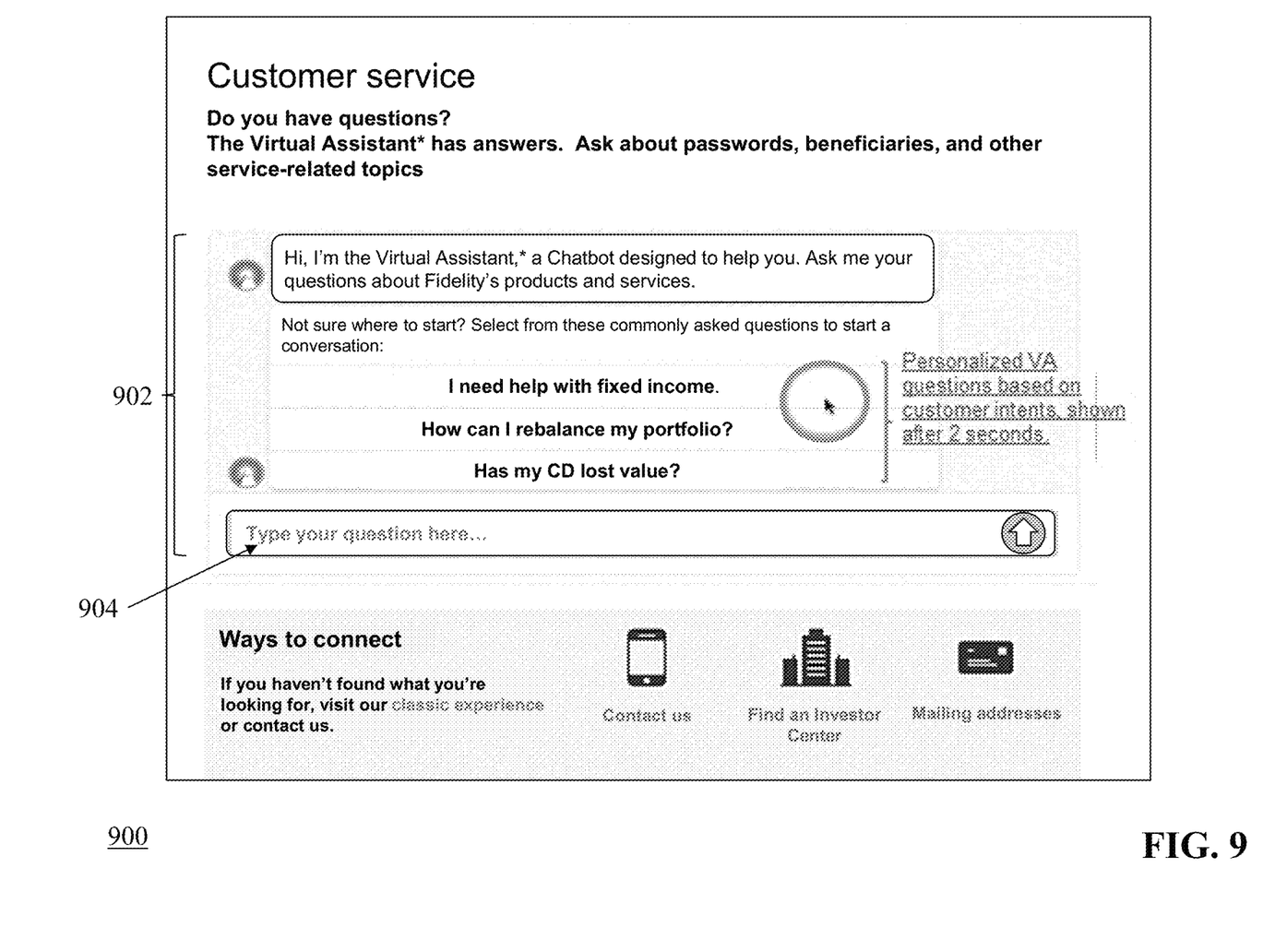
FIG. 9 is a diagram of an exemplary virtual assistant user interface generated by VA module during intervention of a web browsing session.

FIG. 9 is a diagram of an exemplary virtual assistant user interface 900 generated by VA module 106d during intervention of a web browsing session. As shown in FIG. 9, the user interface 900 comprises a virtual assistant area 902 that contains a chat window presenting question-and-answer set(s) to the user and including an input box 904 for the user to type in responses and other information. In the example provided in FIG. 9, the user may have been browsing for information relating to his or her financial accounts (e.g., 401(k), IRA, brokerage accounts) and need predictor module 106b can determine that one of the user's predicted needs is information about fixed income, rebalancing, and/or certificates of deposit (CDs). Q&A module 108b maps this need to a question-and-answer set that includes a list of questions that may be relevant to the user. VA module 106d generates user interface 800 and displays the interface on client device 102, 103. The user can type a question in input box 804 and VA module 106d can generate one or more messages (via message generation module 108c) in response to the input. In some embodiments, VA module 106d automatically displays the personalized Q&A set to the user after a certain amount of time has elapsed (e.g., two seconds) without user action such as providing input to the VA and/or additional browsing actions.

As illustrated above, the sense and intervene workflow provides several significant benefits to the technology, including automatically providing tailored, useful information to a user in real time during a browsing session based upon predictions of user needs that are generated using advanced machine learning algorithms and techniques. In addition, the sense and intervene workflow reduces the volume of user interactions initiated with live customer service representatives by preemptively answering user queries and/or providing desired information, which streamlines customer service operations and provides cost benefits to the enterprise.

Intent Classification

Another use case for the technology described herein relates to newly-created or ongoing VA sessions, in which the techniques are applied to determine and classify a user's intent based upon predicted needs so that VA module 106*d* can provide customized responses to the user. For example, during a VA session between VA module 106*d* and client device 102, 103, natural language understanding (NLU) module 108*a* of VA module 106*d* receives the input messages from the user of client device 102, 103, and transforms the human-readable input into a machine-readable format that is interpreted by NLU module 108*a* (e.g., using natural language processing (NLP) algorithms and/or intent classification algorithms) to classify the input according to a user intent.

Once NLU module 108*a* has generated the user intent, module 108*a* transmits the user intent to Q&A module 108*b*. Q&A module 108*b* also receives the predicted user needs from need predictor module 106*b* and/or need shuffler module 106*c* based upon the user's clickstream data and user profile information (as described above). Q&A module 108*b* utilizes a machine-learning based algorithm (e.g., a classifier such as a neural network or logistic regression) to merge the probabilities for responsive information (e.g., Q&A sets) from the user intent and the predicted user needs. Then, module 108*b* can provide a specific Q&A set that has a highest probability of being responsive to the user intent and user needs. Module 108*b* provides the Q&A set to message generation module 108*c* which presents the Q&A set to user at client device 102, 103 (e.g., via virtual assistant application shown in FIG. 9).

As can be appreciated, the methods and systems described herein provide for an improved virtual assistant application that proactively addresses user needs and intent through intelligent use of clickstream data and personalized user attributes. As a result, the techniques enable a better chat experience for users and reduce both the occurrence of a suboptimal chat experience and the existence of unmet needs of the user.

The above-described techniques can be implemented in digital and/or analog electronic circuitry, or in computer hardware, firmware, software, or in combinations of them. The implementation can be as a computer program product, i.e., a computer program tangibly embodied in a machine-readable storage device, for execution by, or to control the operation of, a data processing apparatus, e.g., a programmable processor, a computer, and/or multiple computers. A computer program can be written in any form of computer or programming language, including source code, compiled code, interpreted code and/or machine code, and the computer program can be deployed in any form, including as a stand-alone program or as a subroutine, element, or other unit suitable for use in a computing environment. A computer program can be deployed to be executed on one computer or on multiple computers at one or more sites. The computer program can be deployed in a cloud computing environment (e.g., Amazon® AWS, Microsoft® Azure, IBM®).

Method steps can be performed by one or more processors executing a computer program to perform functions of the invention by operating on input data and/or generating output data. Method steps can also be performed by, and an apparatus can be implemented as, special purpose logic circuitry, e.g., a FPGA (field programmable gate array), a FPAA (field-programmable analog array), a CPLD (complex programmable logic device), a PSoC (Programmable System-on-Chip), ASIP (application-specific instruction-set processor), or an ASIC (application-specific integrated circuit), or the like. Subroutines can refer to portions of the stored computer program and/or the processor, and/or the special circuitry that implement one or more functions.

Processors suitable for the execution of a computer program include, by way of example, special purpose microprocessors specifically programmed with instructions executable to perform the methods described herein, and any one or more processors of any kind of digital or analog computer. Generally, a processor receives instructions and data from a read-only memory or a random access memory or both. The essential elements of a computer are a processor for executing instructions and one or more memory devices for storing instructions and/or data. Memory devices, such as a cache, can be used to temporarily store data. Memory devices can also be used for long-term data storage. Generally, a computer also includes, or is operatively coupled to receive data from or transfer data to, or both, one or more mass storage devices for storing data, e.g., magnetic, magneto-optical disks, or optical disks. A computer can also be operatively coupled to a communications network in order to receive instructions and/or data from the network and/or to transfer instructions and/or data to the network. Computer-readable storage mediums suitable for embodying computer program instructions and data include all forms of volatile and non-volatile memory, including by way of example semiconductor memory devices, e.g., DRAM, SRAM, EPROM, EEPROM, and flash memory devices; magnetic disks, e.g., internal hard disks or removable disks; magneto-optical disks; and optical disks, e.g., CD, DVD, HD-DVD, and Blu-ray disks. The processor and the memory can be supplemented by and/or incorporated in special purpose logic circuitry.

To provide for interaction with a user, the above described techniques can be implemented on a computing device in communication with a display device, e.g., a CRT (cathode ray tube), plasma, or LCD (liquid crystal display) monitor, a mobile device display or screen, a holographic device and/or projector, for displaying information to the user and a keyboard and a pointing device, e.g., a mouse, a trackball, a touchpad, or a motion sensor, by which the user can provide input to the computer (e.g., interact with a user interface element). Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, and/or tactile input.

The above-described techniques can be implemented in a distributed computing system that includes a back-end component. The back-end component can, for example, be a data server, a middleware component, and/or an application server. The above described techniques can be implemented in a distributed computing system that includes a front-end component. The front-end component can, for example, be a client computer having a graphical user interface, a Web browser through which a user can interact with an example implementation, and/or other graphical user interfaces for a transmitting device. The above described techniques can be implemented in a distributed computing system that includes any combination of such back-end, middleware, or front-end components.

The components of the computing system can be interconnected by transmission medium, which can include any form or medium of digital or analog data communication (e.g., a communication network). Transmission medium can include one or more packet-based networks and/or one or more circuit-based networks in any configuration. Packet-based networks can include, for example, the Internet, a carrier internet protocol (IP) network (e.g., local area network (LAN), wide area network (WAN), campus area network (CAN), metropolitan area network (MAN), home area network (HAN)), a private IP network, an IP private branch exchange (IPBX), a wireless network (e.g., radio access network (RAN), Bluetooth, near field communications (NFC) network, Wi-Fi, WiMAX, general packet radio service (GPRS) network, HiperLAN), and/or other packet-based networks. Circuit-based networks can include, for example, the public switched telephone network (PSTN), a legacy private branch exchange (PBX), a wireless network (e.g., RAN, code-division multiple access (CDMA) network, time division multiple access (TDMA) network, global system for mobile communications (GSM) network), and/or other circuit-based networks.

Information transfer over transmission medium can be based on one or more communication protocols. Communication protocols can include, for example, Ethernet protocol, Internet Protocol (IP), Voice over IP (VOIP), a Peer-to-Peer (P2P) protocol, Hypertext Transfer Protocol (HTTP), Session Initiation Protocol (SIP), H.323, Media Gateway Control Protocol (MGCP), Signaling System #7 (SS7), a Global System for Mobile Communications (GSM) protocol, a Push-to-Talk (PTT) protocol, a PTT over Cellular (POC) protocol, Universal Mobile Telecommunications System (UMTS), 3GPP Long Term Evolution (LTE) and/or other communication protocols.

Devices of the computing system can include, for example, a computer, a computer with a browser device, a telephone, an IP phone, a mobile device (e.g., cellular phone, personal digital assistant (PDA) device, smart phone, tablet, laptop computer, electronic mail device), and/or other communication devices. The browser device includes, for example, a computer (e.g., desktop computer and/or laptop computer) with a World Wide Web browser (e.g., Chrome™ from Google, Inc., Microsoft® Internet Explorer® available from Microsoft Corporation, and/or Mozilla® Firefox available from Mozilla Corporation). Mobile computing device include, for example, a Blackberry® from Research in Motion, an iPhone® from Apple Corporation, and/or an Android™-based device. IP phones include, for example, a Cisco® Unified IP Phone 7985G and/or a Cisco® Unified Wireless Phone 7920 available from Cisco Systems, Inc.

Comprise, include, and/or plural forms of each are open ended and include the listed parts and can include additional parts that are not listed. And/or is open ended and includes one or more of the listed parts and combinations of the listed parts.

One skilled in the art will realize the subject matter may be embodied in other specific forms without departing from the spirit or essential characteristics thereof. The foregoing embodiments are therefore to be considered in all respects illustrative rather than limiting of the subject matter described herein.

What is claimed is:

1. A system for automated predictive virtual assistant intervention, the system comprising a server computing device with a memory for storing computer-executable instructions and a processor that executes the computer-executable instructions to:
 capture, by the server computing device, clickstream data corresponding to one or more web browsing sessions between a client computing device of a user and one or more web servers;
 generate, by the server computing device, one or more predicted needs of the user based upon the clickstream data, comprising:
  creating, from the clickstream data, a time-sequenced set of web pages visited by the user, each web page in the time-sequenced set of web pages associated with a page name text string and a timestamp of when the user visited the web page,
  assigning each web page in the time-sequenced set of web pages visited by the user to a group based upon the timestamp of when the user visited the web page,
  generating a vector representation of the web pages assigned to each group comprising:
   converting the page name text string for each web page in the group into a page embedding comprising a multidimensional array of numeric values;
   determining a weight value for each web page in the group based upon a significance of the page name in the set of web pages; and
   aggregating the page embedding and the weight value for the web pages assigned to each group to generate a machine-readable vector representation of all of the web pages assigned to the group, and
  executing a prediction model using the vector representations as input to generate one or more predicted needs of the user;
 identify, by the server computing device, one or more virtual assistant messages for the user based upon the predicted needs of the user; and
 display, by the server computing device, the identified virtual assistant messages in a virtual assistant application on the client computing device.

2. The system of claim 1, wherein the server computing device augments the vector representation with profile data of the user prior to executing the prediction model.

3. The system of claim 2, wherein the profile data of the user comprises one or more of interaction history information, demographic information, transaction history information, account information, or a current time of interaction.

4. The system of claim 1, wherein the predicted needs of the user comprise one or more granularity levels.

5. The system of claim 1, wherein the one or more predicted needs of the user are compared to one or more needs of a plurality of other users at the time of prediction to update the one or more predicted needs of the user.

6. The system of claim 5, wherein updating the one or more predicted needs of the user comprises re-ordering the one or more predicted needs of the user based upon a ranking of the one or more needs of the plurality of other users at the time of prediction.

7. The system of claim 5, wherein updating the one or more predicted needs of the user comprises re-ordering the one or more predicted needs of the user based upon output from a neural network model trained according to predicted needs and corresponding feedback collected from other users.

8. The system of claim 1, wherein the server computing device activates the virtual assistant application in a browser window of the client computing device and displays the identified virtual assistant messages in the virtual assistant application.

9. The system of claim 8, wherein the server computing device automatically activates the virtual assistant application during an ongoing web browsing session.

10. The system of claim 1, wherein the server computing device determines a user intent based upon one or more input messages received from the client computing device and identifies one or more virtual assistant messages for the user based upon (i) the predicted needs of the user and (ii) the user intent.

11. The system of claim 8, wherein the user at the client computing device interacts with one or more of the virtual assistant messages to receive information.

12. A computerized method of automated predictive virtual assistant intervention, the method comprising:

capturing, by a server computing device, clickstream data corresponding to one or more web browsing sessions between a client computing device of a user and one or more web servers;

generating, by the server computing device, one or more predicted needs of the user based upon the clickstream data, comprising:

creating, from the clickstream data, a time-sequenced set of web pages visited by the user, each web page in the time-sequenced set of web pages associated with a page name text string and a timestamp of when the user visited the web page, assigning each web page in the time-sequenced set of web pages visited by the user to a group based upon the timestamp of when the user visited the web page, generating a vector representation of the web pages assigned to each group comprising:

converting the page name text string for each web page in the group into a page embedding comprising a multidimensional array of numeric values:

determining a weight value for each web page in the group based upon a significance of the page name in the set of web pages; and aggregating the page embedding and the weight value for the web pages assigned to each group to generate a machine-readable vector representation of all of the web pages assigned to the group, and executing a prediction model using the vector representations as input to generate one or more predicted needs of the user;

identifying, by the server computing device, one or more virtual assistant messages for the user based upon the predicted needs of the user; and displaying, by the server computing device, the identified virtual assistant messages in a virtual assistant application on the client computing device.

13. The method of claim 12, wherein the server computing device augments the vector representation with profile data of the user prior to executing the prediction model.

14. The method of claim 13, wherein the profile data of the user comprises one or more of interaction history information, demographic information, transaction history information, account information, or a current time of interaction.

15. The method of claim 12, wherein the predicted needs of the user comprise one or more granularity levels.

16. The method of claim 12, wherein the one or more predicted needs of the user are compared to one or more needs of a plurality of other users at the time of prediction to update the one or more predicted needs of the user.

17. The method of claim 16, wherein updating the one or more predicted needs of the user comprises re-ordering the one or more predicted needs of the user based upon a ranking of the one or more needs of the plurality of other users at the time of prediction.

18. The method of claim 16, wherein updating the one or more predicted needs of the user comprises re-ordering the one or more predicted needs of the user based upon output from a neural network model trained according to predicted needs and corresponding feedback collected from other users.

19. The method of claim 12, wherein the server computing device activates the virtual assistant application in a browser window of the client computing device and displays the identified virtual assistant messages in the virtual assistant application.

20. The system of claim 19, wherein the server computing device automatically activates the virtual assistant application during an ongoing web browsing session.

21. The system of claim 12, wherein the server computing device determines a user intent based upon one or more input messages received from the client computing device and identifies one or more virtual assistant messages for the user based upon (i) the predicted needs of the user and (ii) the user intent.

22. The system of claim 19, wherein the user at the client computing device interacts with one or more of the virtual assistant messages to receive information.

* * * * *